United States Patent
Lu

(10) Patent No.: US 9,720,433 B2
(45) Date of Patent: Aug. 1, 2017

(54) CELLULAR POWER SUPPLY NETWORK, INTELLIGENT GATEWAY AND POWER SUPPLY CONTROL METHOD THEREOF

(76) Inventor: Yong Lu, Beijing (CN)

( * ) Notice: Subject to any disclaimer, the term of this patent is extended or adjusted under 35 U.S.C. 154(b) by 511 days.

(21) Appl. No.: 13/995,884

(22) PCT Filed: Oct. 25, 2011

(86) PCT No.: PCT/CN2011/081233
§ 371 (c)(1),
(2), (4) Date: Jun. 19, 2013

(87) PCT Pub. No.: WO2012/092793
PCT Pub. Date: Jul. 12, 2012

(65) Prior Publication Data
US 2013/0271108 A1   Oct. 17, 2013

(30) Foreign Application Priority Data

Jan. 7, 2011   (CN) .......................... 2011 1 0002781

(51) Int. Cl.
*G05F 3/02* (2006.01)
*H02H 7/04* (2006.01)
(Continued)

(52) U.S. Cl.
CPC .................. *G05F 3/02* (2013.01); *H02H 7/04* (2013.01); *H02J 3/006* (2013.01); *H02J 3/06* (2013.01);
(Continued)

(58) Field of Classification Search
CPC ....................................................... G05F 3/02
(Continued)

(56) References Cited

U.S. PATENT DOCUMENTS 7,061,133 B1 * 6/2006 Leijon ..................... F03D 9/002
174/DIG. 15
8,140,194 B2   3/2012 Iino et al.
(Continued)

FOREIGN PATENT DOCUMENTS

CN            1575551         2/2005
CN           201160223       12/2008
(Continued)

OTHER PUBLICATIONS

Hsu, "Graph theory and interconnect network", 2009, p. 260.*
(Continued)

*Primary Examiner* — Sean Shechtman
(74) *Attorney, Agent, or Firm* — Hanley, Flight & Zimmerman, LLC

(57) ABSTRACT

The embodiments of the present invention provide a cellular power supply network, an intelligent gateway and a power supply control method thereof. The cellular power supply network further comprises: at least one cellular power supply layer formed by a plurality of transformers connected as a cellular structure. In the embodiments of the present invention, the electricity energy can be transferred from one transformer to another transformer demanding power as needed, so that the power is more reasonably distributed and the energy utilization rate is improved. In the technical solutions of the present invention, when a certain transformer cannot work normally due to a fault, the electricity energy outside the transformer can be introduced into the user of the transformer using the cellular power supply network, so as to keep continuous power usage. Meanwhile, the transformer can be separated from the power supply network for repairing and maintenance.

16 Claims, 6 Drawing Sheets

(51) Int. Cl.
*H02J 3/00* (2006.01)
*H02J 3/06* (2006.01)
*H02J 3/38* (2006.01)

(52) U.S. Cl.
CPC .................. *H02J 3/38* (2013.01); *Y04S 10/20* (2013.01); *Y04S 20/14* (2013.01)

(58) Field of Classification Search
USPC ........................................................ 323/361
See application file for complete search history.

(56) References Cited

U.S. PATENT DOCUMENTS

| | | | |
|---|---|---|---|
| 2003/0040335 | A1 | 2/2003 | McIntosh et al. |
| 2003/0144864 | A1* | 7/2003 | Mazzarella .......... G06Q 30/018 705/412 |
| 2007/0055636 | A1 | 3/2007 | Chambers et al. |
| 2010/0223018 | A1* | 9/2010 | Deleo .................... H02J 13/002 702/64 |
| 2010/0295383 | A1* | 11/2010 | Cummings ....... H01L 31/02021 307/151 |
| 2010/0324844 | A1* | 12/2010 | Marti .................... H02H 3/385 702/61 |
| 2012/0143385 | A1* | 6/2012 | Goldsmith ................ H02J 3/38 700/297 |

FOREIGN PATENT DOCUMENTS

| | | | | |
|---|---|---|---|---|
| CN | 101447693 | | 6/2009 | |
| CN | 101789625 | | 7/2010 | |
| CN | 101895115 | | 11/2010 | |
| CN | 101895115 A | * | 11/2010 | ............... H02J 3/38 |
| CN | 102122820 | | 7/2011 | |
| FR | EP 2216627 A1 | * | 8/2010 | ............. G01D 4/004 |

OTHER PUBLICATIONS

Patent Cooperation Treaty, "International Search Report," issued by the International Searching Authority in with PCT application No. PCT/CN2011/081233, mailed Jan. 19, 2012 (8 pages).

Ningxia Electric Power, "Hidden trouble analysis on dual power supply closed loop formed into electromagnetic ooped networks for high risk customer," 2011, issue 5, pp. 13-19, 7 pages.

China Electric Power Education, "Urban low-voltage distribution ring network power supply feasibility analysis," 2009, pp. 176-177, 3 pages.

The State Intellectual Property Office of China, "First Office Action," issued in connection with application No. 201110002781.4, with English translation, on Oct. 19, 2012, 7 pages.

The State Intellectual Property Office of China, "Search Report" issued in connection with application No. 2011100027814, with English translation, on Oct. 19, 2012, 4 pages.

\* cited by examiner

CELLULAR POWER SUPPLY NETWORK, INTELLIGENT GATEWAY AND POWER SUPPLY CONTROL METHOD THEREOF

CROSS-REFERENCE TO RELATED APPLICATION

This application claims priority to Chinese Patent Application No. 201110002781.4, entitled as "a cellular power supply network, intelligent gateway and power supply control method thereof", and filed on Jan. 7, 2011 to the State Intellectual Property Office of the P.R.C, which is hereby incorporated by reference in its entirety.

TECHNICAL FIELD

This invention relates to a brand-new power supply network, and particularly, to a cellular power supply network, and an intelligent gateway and a power supply control method thereof.

BACKGROUND

At present, the distributed power supply system is the unique power supply mode in China and even in the world, and there are a huge number of power substations. Although various countries in the world are studying digital power substations for example, they at most incorporate the existing transformers into a digital platform for the purpose of remote control, which cannot fundamentally solve the variety of problems in the power supply mode.

FIG. 1 is a structure diagram of a distributed power supply network in the prior art. As illustrated in FIG. 1, the power generated by the power plant arrives at a transformer end 101 after a long-distance transmission, and adaptive transformers 102-104 acquire the power from the transformer end 101 and supply it to the users for use. Generally, the phase voltage is 380V/50 HZ (unless there is a requirement for special purposes such as high speed railway etc.). When the adaptive transformers 102-104 themselves or users dominated by the adaptive transformers 102-104 are faulted, the common solution is to shut down the transformer end 101, so that the adaptive transformers 102-104 and their users are all powered off, and only in that case can the maintenance and replacement be carried out. That is, the distributed power supply system requires a power cut before the maintenance. In addition, when the users of the adaptive transformer 102, 103 or 104 strongly require supplying the generated power to the electricity grid, the power could only be supplied within the user range dominated by the adaptive transformer 102, 103 or 104, rather than striding over the adaptive transformer 102, 103 or 104 to be supplied to the users under other adaptive transformers, resulting in decreased power utilization rate.

During the implementation of the present invention, the prior art at least has the following disadvantages: the distributed power supply mode in the prior art has a low energy utilization rate; the power configuration platform in the prior art is closed, which is adverse to the scientific utilization of natural energies such as solar energy and wind energy etc.; and in the distributed power supply mode in the prior art, when a certain transformer is faulted and cannot work normally, the transformer will certainly be shut down, maintained, repaired, etc., thus the residents' power requirements are greatly and negatively influenced, and continuous power supply to the users cannot be ensured.

SUMMARY

The object of the present invention is to provide a cellular power supply network and an intelligent gateway applicable to the cellular power supply network, so as to overcome the deficiencies of the prior art. With the intelligent gateway and a reasonable layout, the existing distributed power supply network is completely reformed into a cellular structure to improve the energy utilization rate.

According to one aspect, in order to achieve the above object, the embodiment of the present invention provides a cellular power supply network, comprising: at least one cellular power supply layer formed by a plurality of transformers connected as a cellular structure.

According to another aspect, in order to achieve the above object, the embodiment of the present invention provides an intelligent gateway of a cellular power supply network, wherein the cellular power supply network comprises: at least one cellular power supply layer formed by a plurality of transformers connected as a cellular structure; and at least one of the plurality of transformers comprises: an intelligent gateway configured to communicate with a power supply control server, and control the states of a plurality of controllable electromagnetic switches of the intelligent gateway according to an instruction from the power supply control server.

According to still another aspect, in order to achieve the above object, the embodiment of the present invention provides a power supply control method of a cellular power supply network, wherein the method is applicable to the cellular power supply network which comprising: at least one cellular power supply layer formed by a plurality of transformers connected as a cellular structure; at least one of the plurality of transformers comprises: an intelligent gateway configured to communicate with a power supply control server, and control states of a plurality of controllable electromagnetic switches of the intelligent gateway according to an instruction from the power supply control server; the method comprising: judging whether a data card is inserted into the intelligent gateway; when there is a data card, acquiring a data address of the intelligent gateway, and judging whether an instruction issued from the power supply control server is received; when no instruction from the power supply control server is received, acquiring transformer parameter(s), and applying to the power supply control server for sending the transformer parameter(s); when the application is accepted, reporting the transformer parameter(s) and the address of the intelligent gateway to the power supply control server; when an instruction from the power supply control server is received, judging whether the instruction is logical; and when the instruction is logical, executing the instruction to control the states of the plurality of controllable electromagnetic switches of the adaptive transformer, or reporting the transformer parameter(s) to the power supply control server.

Through the above technical solutions provided by the embodiments of the present invention, it is beneficial to harmoniously combine various new energies in future with the power supply network, so as to increase the power supplied by the network, and overcome the power transmission deficiencies such as high cost and high loss of the distributed power supply network (e.g., extra-high voltage, direct current and long-distance power transmission, etc.). In the embodiments of the present invention, the power supply mode is changed and the power configuration platform could be opened, so that each private power generation device can supply electricity to the electricity grid, thereby scientifically utilizing the natural energies such as solar energy and wind energy, and avoiding the "threshold" of the grid. In the embodiments of the present invention, the power can be transferred from one transformer to another transformer demanding power, so that the power is more reasonably configured and the energy utilization rate is improved. In the technical solutions of the present invention, when a certain transformer cannot work normally due to a fault, the power outside the transformer can be introduced into the user of the transformer through the intelligent gateway in the embodiments of the present invention using the cellular power supply network, so as to keep continuous power consumption. Meanwhile, the transformer can be separated from the power supply network for repairing and maintenance.

BRIEF DESCRIPTION OF THE DRAWINGS

In order to more clearly describe the technical solutions in the prior art or the embodiments of the present invention, the drawings to be used in the descriptions of the prior art or the embodiments will be briefly introduced as follows. Obviously, the following drawings just illustrate some embodiments of the present invention, and a person skilled in the art can obtain other drawings from them without paying any creative effort.

DESCRIPTION OF THE EMBODIMENTS

In order to make the objects, technical solutions and advantages of the present invention to be clearer, the technical solutions of the embodiments of the present invention will be clearly and completely described as follows with reference to the drawings. Obviously, those embodiments described herein are just parts of the embodiments of the present invention rather than all the embodiments. Based on the embodiments of the present invention, any other embodiments obtained by a person skilled in the art without paying any creative effort shall fall within the protection scope of the present invention.

Figure 1:
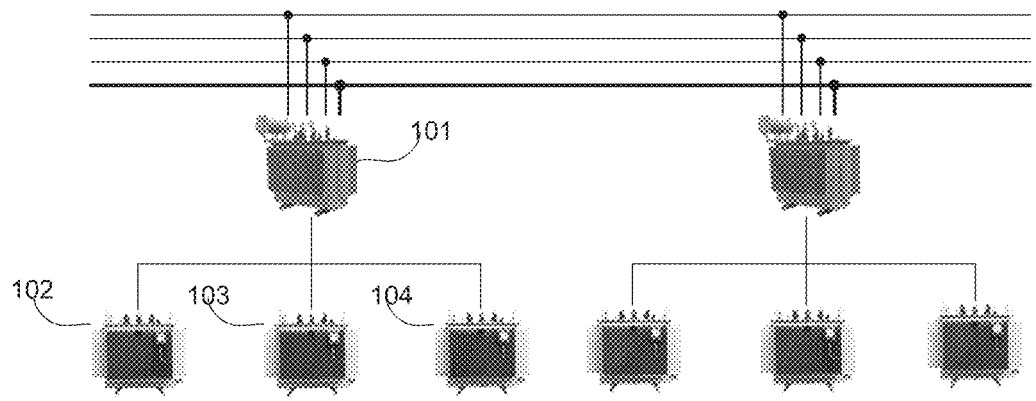
FIG. 1 is a structure diagram of a distributed power supply network in the prior art.
Figure 2:
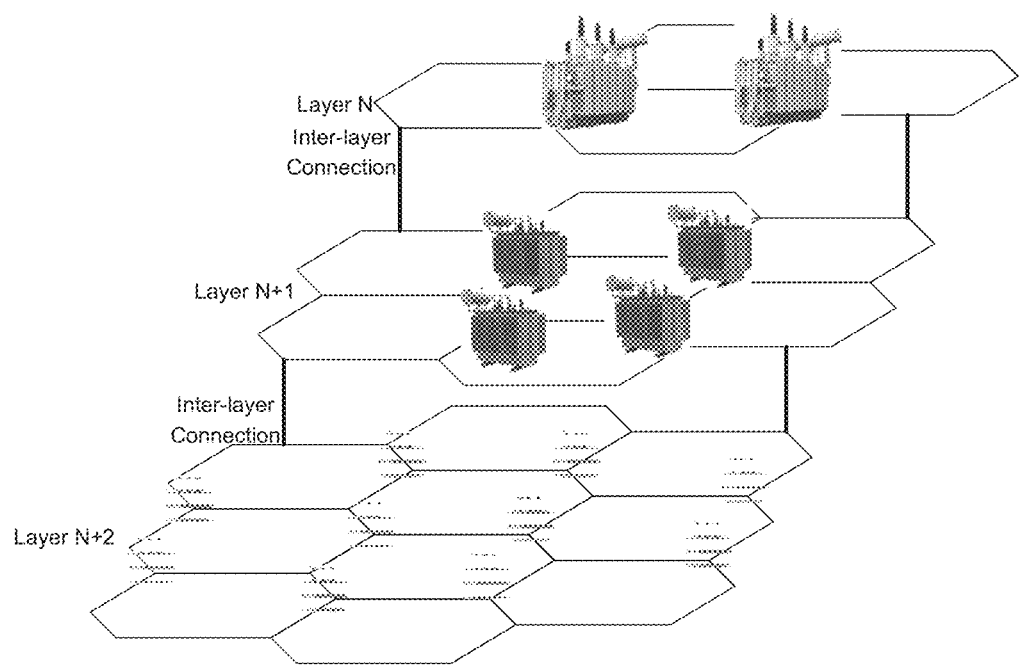
FIG. 2 is a network architecture diagram of a cellular power supply network according to an embodiment of the present invention.

FIG. 2 is a network architecture diagram of a cellular power supply network according to an embodiment of the present invention. As illustrated in FIG. 2, the cellular power supply network includes: at least one cellular power supply layer, wherein the cellular power supply layer is formed by a plurality of transformers connected as a cellular structure.

Preferably, the cellular power supply network includes: a plurality of cellular power supply layers having voltage levels different from each other, wherein each of the cellular power supply layers is connected to one or more cellular power supply layers having adjacent voltage levels, and each of the cellular power supply layers is formed by a plurality of transformers having the same voltage level connected as a cellular structure. Referring to FIG. 2, which exemplarily illustrates a network structure having three cellular power supply layers, i.e., a $N^{th}$ layer, a $(N+1)^{th}$ layer and a $(N+2)^{th}$ layer, but the implementation of the present invention is not limited thereto, and more or less layers may also be included. There is an inter-layer connection, such as a power supply cable, between the $N^{th}$ layer and the $(N+1)^{th}$ layer, and there is also an inter-layer connection between the $(N+1)^{th}$ layer and the $(N+2)^{th}$ layer. The $N^{th}$ layer, the $(N+1)^{th}$ layer and the $(N+2)^{th}$ layer have voltage levels different from each other, e.g., the voltage level of the $N^{th}$ layer is 330 KV, the voltage level of the $(N+1)^{th}$ layer is 220 KV, and the voltage level of the $(N+2)^{th}$ layer is 110 KV. In a case where more cellular power supply layers are required, cellular power supply layers having respective voltage levels may be formed in an order where the voltage levels are progressively decreased as follows: 1500 KV, 1000 KV, 750 KV, 500 KV, 330 KV, 220 KV, 110 KV, 66 KV, 35 KV, 10 KV, 6.6 KV, 0.4 KV, 380V, 220V.

Specifically, transformer(s) included in each cellular power supply layer are connected to one or more cellular power supply layers having adjacent voltage levels through cable(s). For the $(N+1)^{th}$ layer with the voltage level of 220 KV, the layers with adjacent voltage levels are the $(N+2)^{th}$ layer with the voltage level of 110 KV and the $N^{th}$ layer with the voltage level of 330 KV. Specifically, the transformer(s) includes power transformer and/or distribution transformer, and further, the power transformer has a voltage level higher than or equal to 35 KV, and the distribution transformer has a voltage level lower than or equal to 10 KV.

Optionally, at least one of the plurality of transformers includes an intelligent gateway configured to communicate with a power supply control server, and control the states of a plurality of controllable electromagnetic switches of the intelligent gateway according to an instruction from the power supply control server.

Figure 2A:
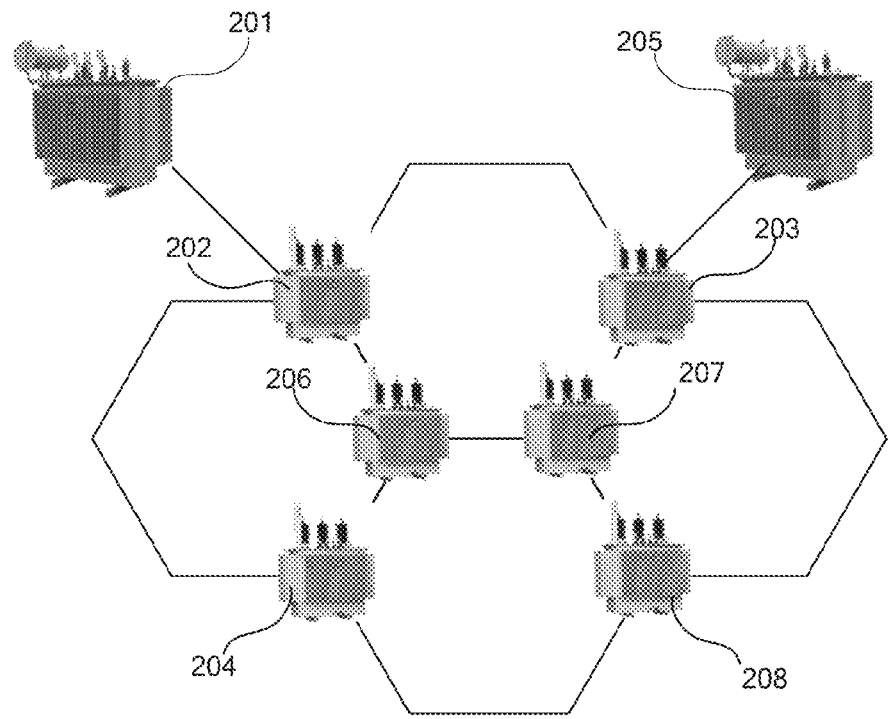
FIG. 2A is a structure diagram of one layer of the cellular power supply network according to an embodiment of the present invention.

FIG. 2A is a network architecture diagram of one layer of a cellular power supply network according to an embodiment of the present invention. As illustrated in FIG. 2A, the cellular power supply network includes a cellular power supply layer formed by a plurality of adaptive transformers 202, 203, 204, 206, 207 and 208 connected as a cellular structure, and an upper cellular power supply layer. FIG. 2A only illustrates two transformers 201 and 205 included in the upper cellular power supply layer, and the plurality of adaptive transformers 202, 203, 204, 206, 207 and 208 are connected as a cellular structure. A binary input (digital input) of any transformer in each of the cellular power supply layers except a cellular power supply layer having the highest voltage level is connected to a binary output (digital output) of a respective upper cellular power supply layer; and a binary output of each of the cellular power supply layers except a cellular power supply layer having the lowest voltage level is connected to a binary input of at least one transformer in the respective lower cellular power supply layer. The connection method is as follows: all of the adaptive transformers in the same cellular power supply layer are independent from each other, i.e., a binary input of each of the adaptive transformers is connected to the respective upper cellular power supply layer, and only when a certain adaptive transformer in the same layer is faulted, its binary input is disconnected from the respective upper cellular power supply layer, and its binary output is connected according to a control instruction, so as to ensure the user's power demand. FIG. 2 does not uniquely illustrate the structure of the cellular network according to the embodiment of the present invention, and there may be various modifications. For example, the adaptive transformers 202, 203, 204, 206, 207 and 208 may also be disposed at the six nodes of an orthohexagonal cellular unit, and the adaptive transformer at each of the nodes is connected to the adaptive transformers at adjacent nodes. The adaptive transformers 202 and 203 are described as an example. When the adaptive transformers 202 and 203 are connected to each other, the binary input of the adaptive transformer 202 is connected to the binary input of the adaptive transformer 203, while the binary output of the adaptive transformer 202 shall be connected to the binary output of the adaptive transformer 203 according to a control instruction. Alternatively, each of the plurality of adaptive transformers 202, 203, 204, 206, 207 and 208 may include an intelligent gateway configured to communicate with a power supply control server, and control a plurality of controllable electromagnetic switches of the intelligent gateway itself to be turned on or off according to an instruction from the power supply control server.

Figure 2B:
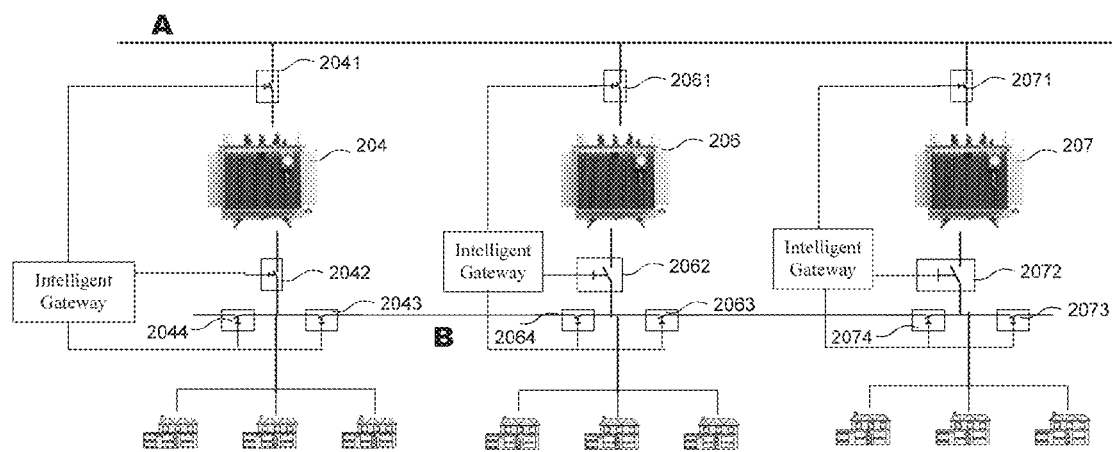
FIG. 2B is a detailed structure diagram of a part of the cellular power supply layer in FIG. 2A according to an embodiment of the present invention.

Next, an example is given to describe the operating process where the cellular power supply network according to the embodiment of the present invention performs a power scheduling. FIG. 2B is a detailed structure diagram of a part of the cellular power supply layer in FIG. 2A according to the embodiment of the present invention. As illustrated in FIG. 2B, the vicinity or the inside of each of the transformers 204, 206 and 207 is provided with an intelligent gateway, but not all transformers need to be supplied with an intelligent gateway. A controllable electromagnetic switch 2041 is at the binary input of the transformer 204, and controllable electromagnetic switches 2042, 2043 and 2044 are at the binary output of the transformer 204. The intelligent gateway of the transformer 204 is connected to the controllable electromagnetic switches 2041, 2042, 2043 and 2044, for controlling them to be turned on or off and monitoring the state of the transformer 204. In an optional embodiment, one intelligent gateway may monitor the states of multiple transformers. Similarly, for the convenience of illustration, transformers 206 and 207 in FIG. 2B are configured similarly to the transformer 204. The transformer 206 also has an intelligent gateway, which controls a controllable electromagnetic switch 2061 at the binary input of the transformer 206, and controllable electromagnetic switches 2062, 2063 and 2064 at the binary output of the transformer 206. The transformer 207 also has an intelligent gateway, which controls a controllable electromagnetic switch 2071 at the binary input of the transformer 207, and controllable electromagnetic switches 2072, 2073 and 2074 at the binary output of the transformer 207. The connection line of the binary inputs of the transformers 204, 206 and 207 is a power supply cable A for supplying power to the upper power supply layer, while 2041, 2061 and 2071 are controllable electromagnetic switches of the binary inputs of the transformers 204, 206 and 207. The connection line of the binary outputs of the transformers 204, 206 and 207 is a power supply cable B for supplying power to the present cellular power supply layer where the transformers 204, 206, and 207 locate, while 2042, 2062 and 2072 indicates controllable electromagnetic switches at the binary outputs of the transformers 204, 206 and 207. The controllable electromagnetic switches 2043, 2044, 2063, 2064, 2073 and 2074 can control the connection of the power supply cable B.

When the transformer 204 is damaged, the controllable electromagnetic switches 2041 and 2042 are turned off, while the controllable electromagnetic switch 2043, the controllable electromagnetic switches 2063 and 2064 of the transformer 206, and the controllable electromagnetic switch 2074 of the transformer 207 are turned on, so that the supply current of the user dominated by the transformer 204 is directly supplied by the transformers 206 and 207, and the transformer 204 is isolated for a maintenance. When the power supply load of the transformer 204 is too large, the controllable electromagnetic switch 2074 of the transformer 207, the controllable electromagnetic switches 2063 and 2064 of the transformer 206, and the controllable electromagnetic switch 2043 of the transformer 204 may be turned on to supply supplementary current, so as to reduce the load of the transformer 204. For the transformer 207, the supply current of the transformers 204 and 206 may meet the power supply requirement of the transformer 204 after the controllable electromagnetic switches are turned on, and if the power supply requirement is still not met, the transformers 204 and 206 may be taken as a virtual supply transformer to the transformer 207. During the power supply, the load of the virtual transformer will also be transferred to the transformer 207, which is required by the grid.

In conclusion, when the power consumption load of the adaptive transformer 204 is too large, while the power consumption load of the adaptive transformer 207 is too low, in the embodiment of the present invention the intelligent gateway of the adaptive transformer 207 will be activated, to which a remote power supply control server sends an instruction, so as to connect in tandem the binary output of the adaptive transformer 207 to the adaptive transformer 206. Meanwhile, the intelligent gateway of the adaptive transformer 206 is also activated so that overabundance power sinks into the grid of the adaptive transformer 206, and in turn sinks into the electricity grid of the adaptive transformer 204 by closing of an intelligent gateway line of the adaptive transformer 206. Thus a virtual transformer mode is formed, so that user(s) of the adaptive transformer 207 and user(s) of the adaptive transformer 204 employ the same virtual transformer, and the overabundance power of the adaptive transformer 207 is transferred to the adaptive transformer 204, thus the adaptive transformer 204 is supplied with sufficient power, and the power utilization rate of the adaptive transformer 207 is improved. In the distributed power supply network, although there is also an intelligent gateway, only one-way cut-off is allowed, and on-demand power connection in tandem cannot be achieved, as a result, the lower-end users of the disconnected transformer are powered off. Thus, the flexible power connection-in-tandem mode can only be realized in the cellular power supply network.

In addition, one of the core elements of the intelligent grid is an open power network structure. Renewable energy power generation and household intelligent power consumption and generation are encouraged. For another example, the extra power of the in-network household power generation can be transmitted to the electricity grid. In other existing power supply networks, such as the distributed power supply network and the micro-grid power supply network, when the power supply load of the adaptive transformer 207 is too small, the power generation benefit is also reduced. The power generation efficiency is transferred to other electricity grid only when the present cellular network is used for power supply, so as to improve the power generation benefit. As illustrated in FIG. 2, the power of the adaptive transformer 207 may be transferred to the adaptive transformer 202, 203, 204, 206 or 208, which is realized for the electricity selling price of the electricity grid, and when the electricity selling price is high, the users are more active in household power generation, thereby improving the power utilization efficiency.

Figure 3:
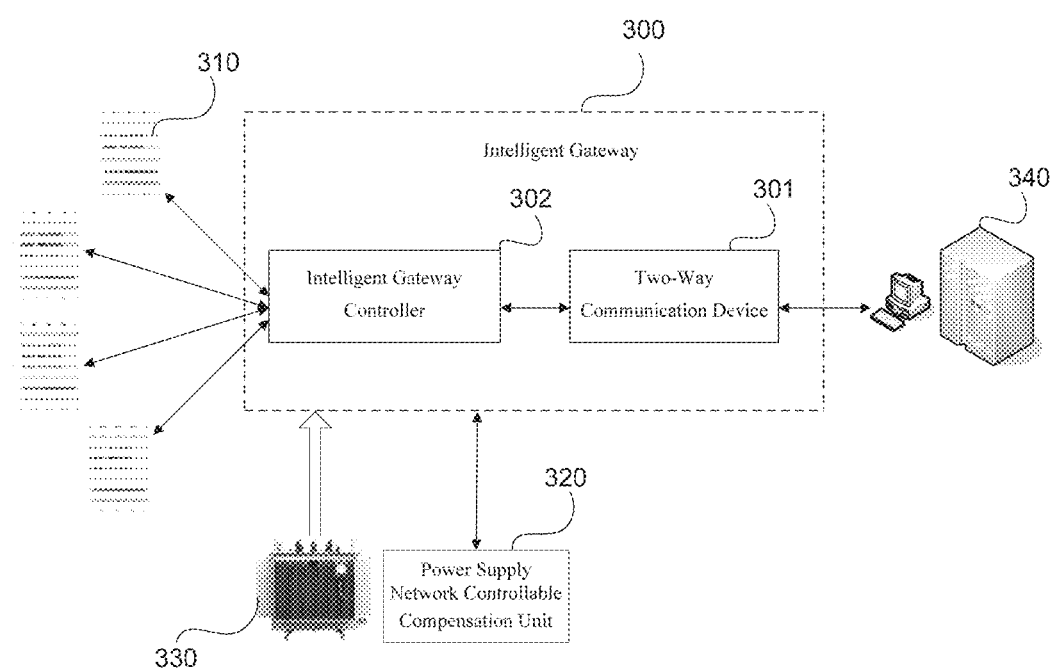
FIG. 3 is an overall structure diagram of an intelligent gateway of a cellular power supply network according to an embodiment of the present invention.

FIG. 3 is an overall structure diagram of an intelligent gateway of a cellular power supply network according to an embodiment of the present invention. Referring to FIGS. 2A and 3, the detailed internal structure of each of the adaptive transformers 202, 203, 204, 206, 207 and 208 in FIG. 2A is illustrated in FIG. 3, and the adaptive transformer 202 is taken as an example herein, including: an intelligent gateway 300 and multi-output controllable electromagnetic switches 310. Although FIG. 3 illustrates four controllable electromagnetic switches 310, more (e.g., eight) controllable electromagnetic switches may be included in practice. The controllable electromagnetic switches 310 are connected to the cellular-connecting cables (not illustrated in the drawing) of other adaptive transformers, and the above two adaptive transformers are controlled to be connected to or disconnected from each other through the on or off state of the controllable electromagnetic switches 310. In another embodiment, the adaptive transformer further includes a power supply network controllable compensation unit 320 configured to perform a power factor compensation for the electricity grid. For example, in one embodiment, the transformer 330 may be the transformer 201 on the upper layer in FIG. 2A, or the adaptive transformer 203, 204 or 206 in the cellular network of the same layer or level, or a lower-layer adaptive transformer in the cellular network of a lower layer or level. In this way, the power generated by the user utilizing natural energy on his own initiative may be input to the adaptive transformer 202 in the upper layer, and then scheduled to other adaptive transformer(s).

Referring to FIG. 3 again, the intelligent gateway 300 includes a two-way communication device 301 and an intelligent gateway controller 302. The two-way communication device 301 is configured to parse an instruction issued by a power supply control server 340, transmit the parsed instruction to the intelligent gateway controller 302, and forward transformer parameter(s) transmitted by the intelligent gateway controller 302 to the power supply control server 340. The two-way communication device 301 may be optical fiber/wireless (3G/GSM, etc.) means or communication means developed and applied in the future, an electric power load control means, etc. The two-way communication device 301 uses a two-way real-time online communication mode to communicate with the power supply control server, and it may be formed by a network system after the integration of three networks is realized in the future. In which, the power supply control server 340 can perform a remote scheduling, and the instruction(s) issued by the power supply control server includes, but not limited to, controlling corresponding controllable electromagnetic switch 310 to be turned on or off, sampling binary input parameter(s), sampling binary output parameter(s), performing a quality factor compensation for the power supply network, sampling transformer power, sampling transformer temperature, sampling environmental temperature and humidity of the transformer, etc.

The intelligent gateway controller 302 is configured to control the states of the plurality of controllable electromagnetic switches 310 of the intelligent gateway, according to the parsed instruction transmitted by the two-way communication device 301, and report the transformer parameter(s) to the power supply control server 340 through the two-way communication device 301. The intelligent gateway controller 302 can control the connection and disconnection of the power supply line, sample the transformer parameter(s), and perform a power factor compensation for the electricity grid. In which, the controllable electromagnetic switches 310 are configured to connect and disconnect the electricity grid according to the grid power demand.

In which, the transformer parameter(s) include, but not limited to, binary output parameter(s) of the transformer, binary input parameter(s) of the transformer, state parameter of the transformer, and parameter(s) of environment for the transformer. The binary output parameter(s) of the transformer includes: the sampled electricity grid parameter(s) of the binary output, such as phase current, phase voltage, frequency and power factor, etc. The binary input parameter(s) of the transformer includes: parameter(s) of the upper-level power supply network (network with the upper voltage level) of the adaptive transformer, such as phase current, phase voltage, frequency and power factor, etc. The state parameter of the transformer includes: parameters related to online state of the transformer, such as temperature variation, online transformation ratio, nonlinear distortion and rated frequency of the transformer, etc. The parameter(s) of environment for the transformer includes state of the transformer's environment, such as environmental factors like temperature, humidity, etc.

Referring to FIGS. 2A and 3 again, the upper transformers 201 and 205 only supply power to the adaptive transformers 202, 203, 204, 206, 207 and 208 in the power transmission network, which do not belong to either of the upper transformers 201 and 205. The transformers may perform power transformation and supplementation through the connecting lines of the cellular power supply network. Although having no change in function and attribute, the users dominated by each adaptive transformer will not confront dangers such as power-off, overload, etc. For example, when the transformer 202 or its user is faulted, the adaptive transformer 203 or 204 can be switched to the user area dominated by the transformer 202 by the intelligent gateway 300 remotely controlled by the power supply control server 340 in the embodiment of the present invention, so that the adaptive transformer 202 is separated from the power supply network for a shut-down maintenance while the user's power demand is maintained. For another example, when the adaptive transformer 206 is faulted, the upper transformer 201 may directly supply power to the user of the adaptive transformer 206 through the cellular network by means of the adaptive transformer 202, so that the adaptive transformer 206 can be separated again for a shut-down maintenance.

When some users of the transformer, on his own initiative, generate and supply power to electricity grid, the electricity energy can be broadly spread. For example, when a user dominated by the adaptive transformer 204 generates and supplies power to electricity grid, and if the users dominated by the adaptive transformer 204 cannot completely consume the generated power, it may introduce the generated power from the adaptive transformer 204 into other adaptive transformers, including the adaptive transformers 202, 203, 206, 207 and 208, so as to maximize the efficacy and benefit of the user who, on his own initiative, generates power.

Figure 4:
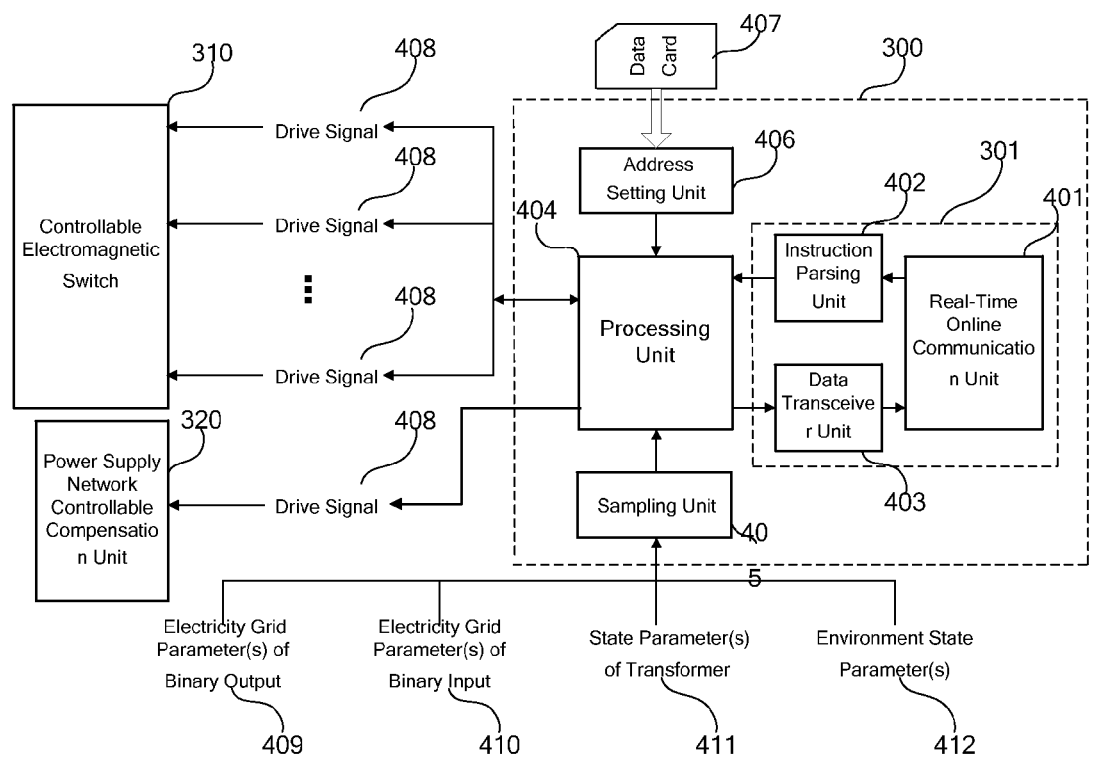
FIG. 4 is a detailed structure diagram of an intelligent gateway of a cellular power supply network according to an embodiment of the present invention.

FIG. 4 is a detailed structure diagram of an intelligent gateway of a cellular power supply network according to an embodiment of the present invention. Referring to FIGS.

3-4, the two-way communication device 301 includes a real-time online communication unit 401, an instruction parsing unit 402 and a data transceiver unit 403, wherein the real-time online communication unit 401 is connected to the instruction parsing unit 402 and the data transceiver unit 403, respectively. The real-time online communication unit 401 is configured to perform a two-way communication with the power supply control server 340, receive an instruction issued by the power supply control server 340, transmit the instruction to the instruction parsing unit 402, and transmit the transformer parameter(s) received from the data transceiver unit 403 to the power supply control server 340. The instruction parsing unit 402 is configured to parse the instruction, and transmit the parsed instruction to the intelligent gateway controller 302. The data transceiver unit 403 is configured to transmit the transformer parameter(s) reported by the intelligent gateway controller 302 to the real-time online communication unit 401.

Referring to FIG. 4, optionally, the intelligent gateway controller specifically includes a processing unit 404 and a sampling unit 405. The processing unit 404 is configured to generate a drive signal 408 for controlling the states of a plurality of controllable electromagnetic switches 310 according to the instruction issued by the power supply control server 340 and parsed, trigger the sampling unit 405 to sample the transformer parameter(s), and send the transformer parameter(s) to the two-way communication device 301. The sampling unit 405 is configured to sample the transformer parameter(s) under the control of the processing unit 404 and feed back to the processing unit 404. In which, the transformer parameter(s) include electricity grid parameter(s) of binary output 409, electricity grid parameter(s) of binary input 410, state parameter(s) of transformer 411 and environment state parameter(s) 412 as illustrated in FIG. 4. Specifically, the processing unit 404 may be configured by a single chip microcomputer or other embedded computer, etc. The sampling unit 405 may be various sensors related to the transformer(s) and the switch(es), such as thermometer, hygrometer, galvanometer, voltmeter, power meter, environmental temperature meter, etc.

In another optional embodiment, the two-way communication device 301 may just include the real-time online communication unit 401, while the intelligent gateway controller 302 includes the instruction parsing unit 402 and the data transceiver unit 403 described as above. In this embodiment, the instruction parsing unit 402, the data transceiver unit 403, the processing unit 404 and the sampling unit 405 construct the intelligent gateway controller 302.

In another optional embodiment, the instruction parsing unit 402 and the data transceiver unit 403 are integrally provided inside the processing unit 404.

In another optional embodiment, the intelligent gateway controller may further include an address setting unit 406 connected to the processing unit 404 and configured to set an address of the intelligent gateway, which is beneficial to the batch production and maintenance of the apparatus.

Figure 5:
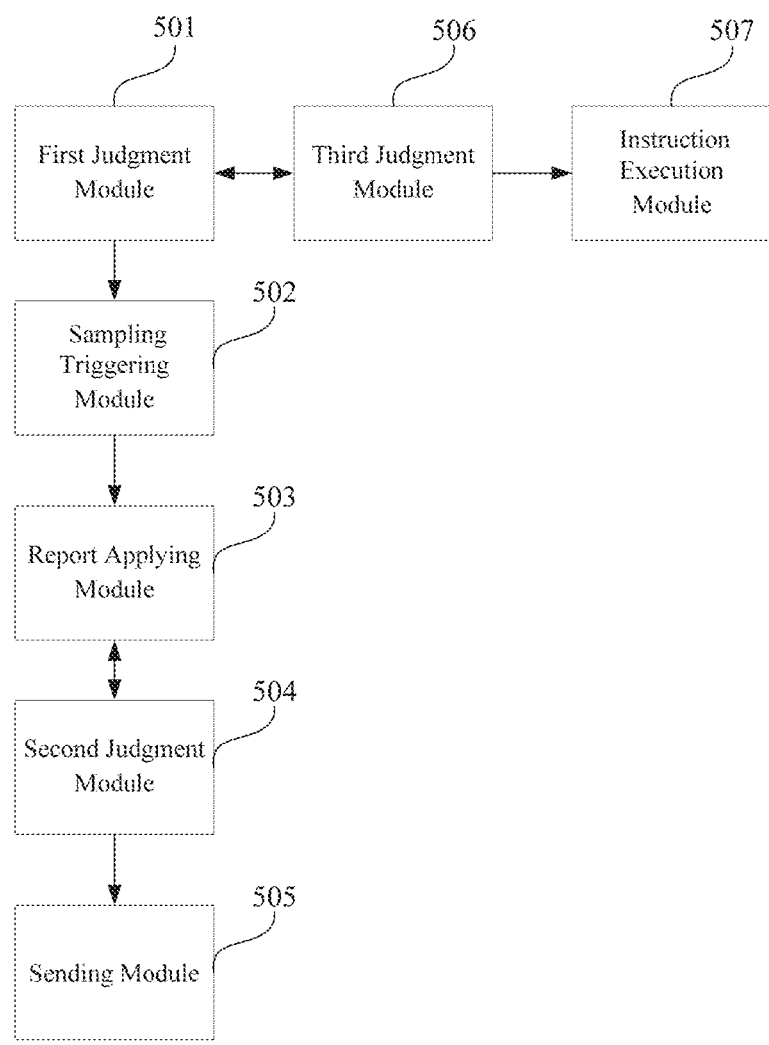
FIG. 5 is a detailed functional block diagram of a processing unit 404 in FIG. 4 according to an embodiment of the present invention.

FIG. 5 is a detailed functional block diagram of the processing unit 404 in FIG. 4 according to an embodiment of the present invention. Referring to FIGS. 3-5, optionally, the processing unit 404 specifically may include: a first judgment module 501 configured to judge whether an instruction sent by the power supply control server 340 is received; a sampling triggering module 502 configured to trigger the sampling unit 405 to sample the transformer parameter(s) when the judgment result of the first judgment module 501 is "No"; a report applying module 503 configured to apply to the power supply control server 340 for reporting the transformer parameter(s); a second judgment module 504 configured to judge whether the report applying is accepted; and a sending module 505 configured to report the transformer parameter(s) to the power supply control server 340 when the judgment result of the second judgment module 504 is "Yes". In an optional embodiment, the second judgment module 504 may be further connected to the sampling triggering module 502 and configured to start the sampling triggering module 502 when the report application is not accepted.

Optionally, the processing unit 404 may further include: a third judgment module 506 connected to the first judgment module 501 and configured to judge whether the parsed instruction issued by the power supply control server 340 is logical when the judgment result of the first judgment module 501 is "Yes"; and an instruction execution module 507 configured to execute the instruction issued by the power supply control server 340 when the judgment result of the third judgment module 506 is "Yes".

Figure 6:
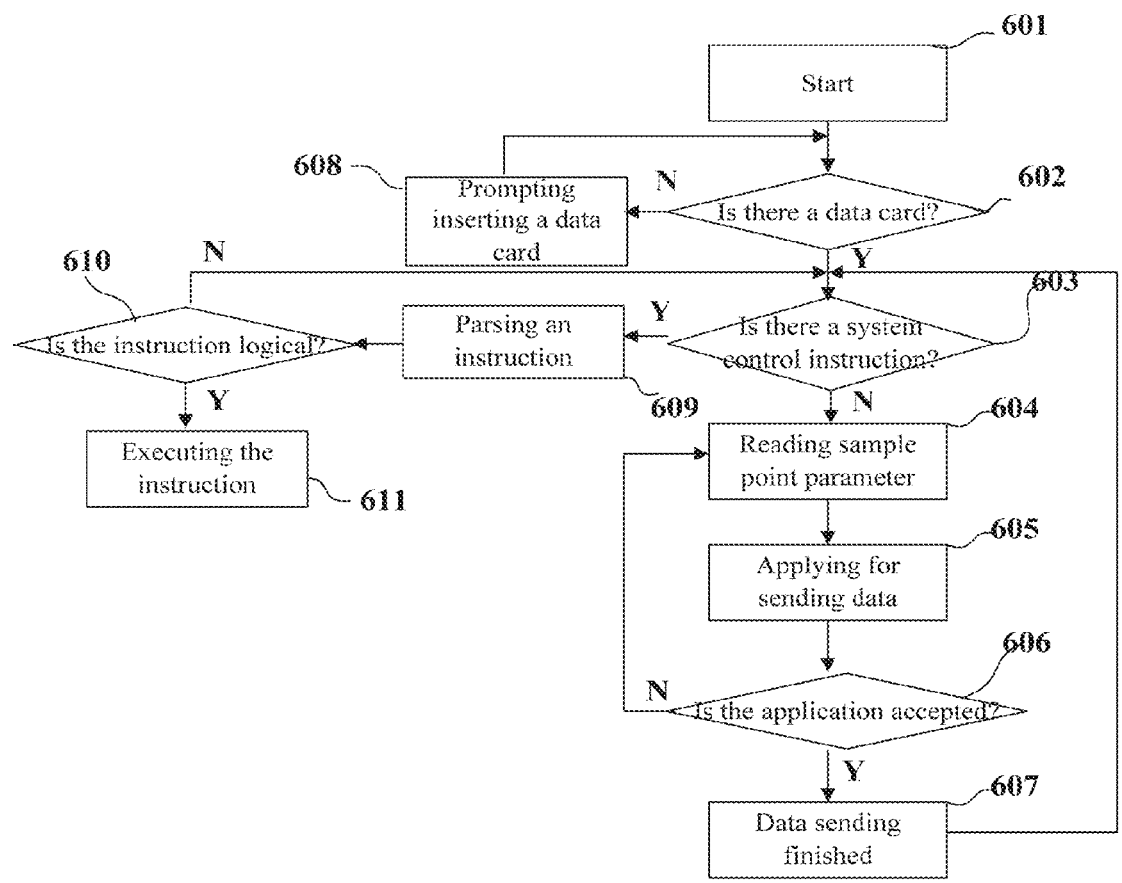
FIG. 6 is an operating flowchart of an intelligent gateway controller according to an embodiment of the present invention.

FIG. 6 is an operating flowchart of an intelligent gateway controller according to an embodiment of the present invention. The flow is executed by a single chip microcomputer configured to perform a data sampling for the transformer(s), control the controllable electromagnetic switch(s), perform a power factor compensation for the electricity grid, receive and transmit online system control instruction and data in read-time. As illustrated in FIG. 6, the flow specifically includes the following steps:

Step 601: starting the flow.

Step 602: judging whether a data card is inserted into the intelligent gateway, so as to judge whether a work state is entered; if yes, turning to step 603, otherwise turning to step 608.

Step 608: when there is no data card, keeping a wait state and prompting to insert a data card.

Step 603: when there is a data card, further judging whether there is any system control instruction, such as scheduling instruction or sampling instruction, and if yes, turning to step 609, otherwise turning to step 604.

Step 604: when there is no system scheduling instruction, reading sample point parameter(s) which includes binary output/binary input sample data and environmental data, etc., as illustrated in FIG. 4.

Step 605: applying to the power supply control server for sending the above sampled data. In this embodiment, two report modes are available, i.e., active report and passive report, wherein the mode of actively reporting the transformer parameter(s) is beneficial for the power supply control server to timely deal with emergencies, such as overheating of the adaptive transformer, line short, etc.

Step 606: judging whether the report application is accepted; if not, keeping a wait state, then returning to step 605 and continuing to apply for a report, or returning to step 604 to sample updated parameters and then applying for a report.

Step 607: when the report application is accepted, sending the sampled data and data in the data card to the power supply control server 340.

Step 609: when there is system control instruction(s), parsing the instruction to judge the purpose thereof. Specifically, the system control instruction(s) includes, but not limited to: 1. turning on or off corresponding controllable electromagnetic switch(s); 2. performing a quality factor compensation for the power supply network; 3. sampling the binary input parameter(s); 4. sampling the binary output parameter(s); 5. sampling the transformer power; 6. sampling the transformer temperature; 7. sampling the environmental temperature. Then step 610 shall be performed. If the two-way communication device has parsed the system control instruction, the parsing may be not carried out in step 609.

Step 610: performing a logical judgment on the instruction, and turning to step 603 when the instruction is illogical; herein the term "illogical" generally refers to the content not in conformity with specification of the instruction, such as instantaneous same frequency interference; and when the instruction is logical, turning to step 611.

Step 611: executing the logical instruction while not executing the illogical instruction The technical solutions provided by the embodiments of the present invention can quickly and timely transfer the current to the places needing it most. For example, in the daytime working hours, the power consumptions of many business office buildings and industrial and mining enterprises are increased, and a lot of power may be transferred to those places through the cellular power supply network of the present invention, so that the power distribution is more reasonable, thereby effectively improving the energy utilization rate without increasing the power generation capacity.

The above embodiments are just used to describe the technical solutions of the present invention, rather than making limitations thereto. Although the present invention is described in details with reference to the above embodiments, a person skilled in the art shall appreciate that the technical solutions of the above embodiments can be modified, or some technical features thereof can be equivalently substituted, while those modifications or substitutions do not cause the essences of corresponding technical solutions to deviate from the spirit and the range of the technical solutions of the embodiments of the present invention.

What is claimed is:

1. A cellular power supply network, comprising:
   at least one cellular power supply layer, each of the at least one cellular power supply layer formed by a plurality of transformers in the same voltage level that are connected as a cellular structure,
   wherein a first one of the plurality of transformers comprises:
      an intelligent gateway configured to communicate with a power supply control server and to control states of a plurality of controllable electromagnetic switches of at least one transformer according to an instruction from the power supply control server, so as to control the plurality of transformers to be connected to or disconnected from each other, the first one of the plurality of transformers configured to selectively supply power to a first load of a second one of the plurality of transformers and a second load of a third one of the plurality of transformers,
      the intelligent gateway configured to:
         detect at least one of failure of the second one of the plurality of transformers, a condition in which the first load on the second one of the plurality of transformers exceeds a capacity of the second one of the plurality of transformers, or an increase in the load on the first one of the plurality of transformers,
         in response to the detecting, control the states of the plurality of controllable electromagnetic switches to serve current from the first one of the plurality of transformers to the first load of the second one of the plurality of transformers,
   wherein the first one of the plurality of transformers, the second one of the plurality of transformers, and the third one of the plurality of transformers are configured to transform power from a cellular power supply layer with a voltage level higher than the voltage level.

2. The cellular power supply network according to claim 1, wherein the cellular power supply network further comprises:
   a plurality of cellular power supply layers having voltage levels different from each other, wherein each of the cellular power supply layers is connected to one or more cellular power supply layers in having adjacent voltage levels.

3. The cellular power supply network according to claim 2, wherein each of the cellular power supply layers is connected to one or more cellular power supply layers having adjacent voltage levels through power supply cables.

4. The cellular power supply network according to claim 2, wherein a binary input of at least one transformer in each of the cellular power supply layers except for a cellular power supply layer in the highest voltage level is connected to a binary output of an upper cellular power supply layer; and a binary output of each of the cellular power supply layers except for a cellular power supply layer in the lowest voltage level is connected to a binary input of at least one transformer in a lower cellular power supply layer.

5. The cellular power supply network according to claim 1, wherein the intelligent gateway comprises a two-way communication device and an intelligent gateway controller;
   the two-way communication device is configured to parse an instruction issued by the power supply control server, transmit the parsed instruction to the intelligent gateway controller, and forward transformer parameters transmitted by the intelligent gateway controller to the power supply control server; and
   the intelligent gateway controller is configured to control a binary output and a binary input of the transformer through the intelligent gateway, according to the parsed instruction transmitted by the two-way communication device, and report the transformer parameters to the power supply control server through the two-way communication device.

6. The cellular power supply network according claim 5, wherein the transformer comprises a power transformer and/or a distribution transformer.

7. The cellular power supply network according to claim 1, wherein the transformer comprises a power transformer and/or a distribution transformer.

8. The cellular power supply network according to claim 2, wherein the transformer comprises a power transformer and/or a distribution transformer.

9. The cellular power supply network according to claim 3, wherein the transformer comprises a power transformer and/or a distribution transformer.

10. The cellular power supply network according to claim 4, wherein the transformer comprises a power transformer and/or a distribution transformer.

11. The cellular power supply network according to claim 1, wherein a binary input of the first one of the plurality of transformers is connected to a binary input of the second one of the plurality of transformers, while a binary output of the first one of the plurality of transformers is connected to a binary output of the second one of the plurality of transformers according to a control instruction.

12. An intelligent gateway of a cellular power supply network, wherein the cellular power supply network comprises:

at least one cellular power supply layer, each of the at least one cellular power supply layer is formed by a plurality of transformers in the same voltage level that are connected as a cellular structure, a first one of the plurality of transformers configured to selectively supply power to a first load of a second one of the plurality of transformers and a second load of a third one of the plurality of transformers;

the intelligent gateway configured to:
  communicate with a power supply control server;
  control states of a plurality of controllable electromagnetic switches of the intelligent gateway according to an instruction from the power supply control server, so as to control the plurality of transformers to be connected to or disconnected from each other;
  detect at least one of failure of the second one of the plurality of transformers, a condition in which the first load on the second one of the plurality of transformers exceeds a capacity of the second one of the plurality of transformers, or an increase in the load on the first one of the plurality of transformers; and
  in response to the detecting, control the states of the plurality of controllable electromagnetic switches to serve current from the first one of the plurality of transformers to the first load of the second one of the plurality of transformers,
  wherein the first one of the plurality of transformers, the second one of the plurality of transformers, and the third one of the plurality of transformers are configured to transform power from a cellular power supply layer with a voltage level higher than the voltage level.

13. The intelligent gateway of a cellular power supply network according to claim 12, wherein the intelligent gateway comprises a two-way communication device and an intelligent gateway controller;
  the two-way communication device is configured to parse an instruction issued by the power supply control server, transmit the parsed instruction to the intelligent gateway controller, and forward transformer parameters transmitted by the intelligent gateway controller to the power supply control server; and
  the intelligent gateway controller is configured to control the states of the plurality of controllable electromagnetic switches of the intelligent gateway, according to the parsed instruction transmitted by the two-way communication device, and report the transformer parameters to the power supply control server through the two-way communication device.

14. The cellular power supply network according to claim 12, wherein the plurality of transformers comprise one or more first transformers and one or more second transformers that are adjacent to the first transformers, wherein a binary input of the first transformer is connected to a binary input of the second transformer, while a binary output of the first transformer is connected to a binary output of the second transformer according to a control instruction.

15. A power supply control method of a cellular power supply network, wherein the method is applicable to the cellular power supply network which comprises:
  at least one cellular power supply layer, each of the at least one power supply layer formed by a plurality of transformers in the same voltage level that are connected as a cellular structure;
  a first one of the plurality of transformers comprises:
  an intelligent gateway configured to communicate with a power supply control server and to control states of a plurality of controllable electromagnetic switches of the intelligent gateway according to an instruction from the power supply control server, so as to control the plurality of transformers to be connected to or disconnected from each other, the first one of the plurality of transformers configured to selectively supply power to a first load of a second one of the plurality of transformers and a second load of a third one of the plurality of transformers; the method comprising:
  detecting at least one of failure of the second one of the plurality of transformers, a condition in which the first load on the second one of the plurality of transformers exceeds a capacity of the second one of the plurality of transformers, or an increase in the load on the first one of the plurality of transformers,
  in response to the detecting, controlling the states of the plurality of controllable electromagnetic switches to serve current from the first one of the plurality of transformers to the first load of the second one of the plurality of transformers,
  wherein the first one of the plurality of transformers, the second one of the plurality of transformers, and the third one of the plurality of transformers are configured to transform power from a cellular power supply layer with a voltage level higher than the voltage level.

16. The power supply control method according to claim 15, further including:
  judging whether a data card is inserted into the intelligent gateway;
  when there is a data card, acquiring an address of the intelligent gateway, and judging whether an instruction from the power supply control server is received;
  when no instruction from the power supply control server is received, acquiring transformer parameter(s), and applying to the power supply control server for sending the transformer parameter(s);
  when the applying for sending the transformer parameter(s) is accepted, reporting the transformer parameter(s) and the address of the intelligent gateway to the power supply control server;
  when an instruction from the power supply control server is received, judging whether the instruction is logical; and
  when the instruction is logical, executing the instruction to control the states of the plurality of controllable electromagnetic switches of the intelligent gateway, or reporting the transformer parameter(s) to the power supply control server.

* * * * *